United States Patent [19]
Antoniello et al.

[11] Patent Number: 6,021,952
[45] Date of Patent: Feb. 8, 2000

[54] COMBINATION CHECK VALVE, SHUTOFF AND SEAL FOR THERMOSTATIC VALVE

[75] Inventors: Frank Antoniello, Commack; Alex Maxim, Farmingdale, both of N.Y.

[73] Assignee: IW Industries, Inc., Melville, N.Y.

[21] Appl. No.: 09/090,062

[22] Filed: Jun. 3, 1998

[51] Int. Cl.[7] .................................................... G05D 23/13
[52] U.S. Cl. .................................. 236/12.16; 137/614.17
[58] Field of Search ...................... 137/614.17; 236/12.1, 236/12.16

[56] References Cited

U.S. PATENT DOCUMENTS

| | | | |
|---|---|---|---|
| 2,679,861 | 6/1954 | Campbell | 137/614.17 |
| 3,146,792 | 9/1964 | Donnelly et al. | 137/614.17 |
| 3,595,474 | 7/1971 | Humpert | 137/614.17 |
| 4,846,221 | 7/1989 | Kanemaru | 137/614.17 |
| 4,928,725 | 5/1990 | Graves | 137/614.17 |

*Primary Examiner*—William E. Tapolcai
*Attorney, Agent, or Firm*—Alfred M. Walker

[57] ABSTRACT

A combination check valve, shutoff and seal cartridge is provided for a thermostatic valve, wherein the thermostatic valve includes hot and cold water inlets communicating with an ON/OFF/volume control and/or diverting water valve. The water output of the water volume control is then plumbed to a tub spout, faucet, showerhead or other plumbing device(s). The thermostatic valve has a body with both the cold water inlet and the hot water inlet, and a mixed temperature water outlet for mixed water of a predetermined temperature. Each inlet has respective ports accepting a corresponding combination check valve shutoff and seal cartridge. The cartridge has a housing with a spring therein. The cartridge housing has a seat element, and a pair of elastomeric stop seals fitted in respective sides of the cartridge housing. The seals seal a fluid flow path to the inner sides of the ports of the thermostatic valve body at the hot and cold water inlets of the thermostatic valve body. In an open position water pressure overcomes the spring force of the spring, pushing the seat element away from a respective seal a predetermined distance to permit entry of cold or hot water therein. In a closed shutoff valve mode, the cartridge housing is rotatable 180 degrees, wherein water inlet pressure creates a force in the same direction as the spring which forces the seat element against the seal, to prevent the flow of hot or cold water therethrough.

13 Claims, 8 Drawing Sheets

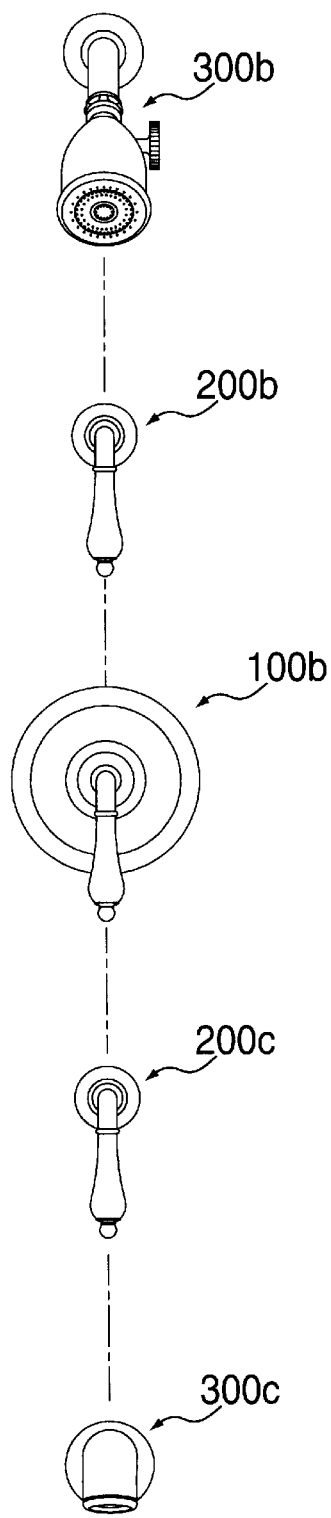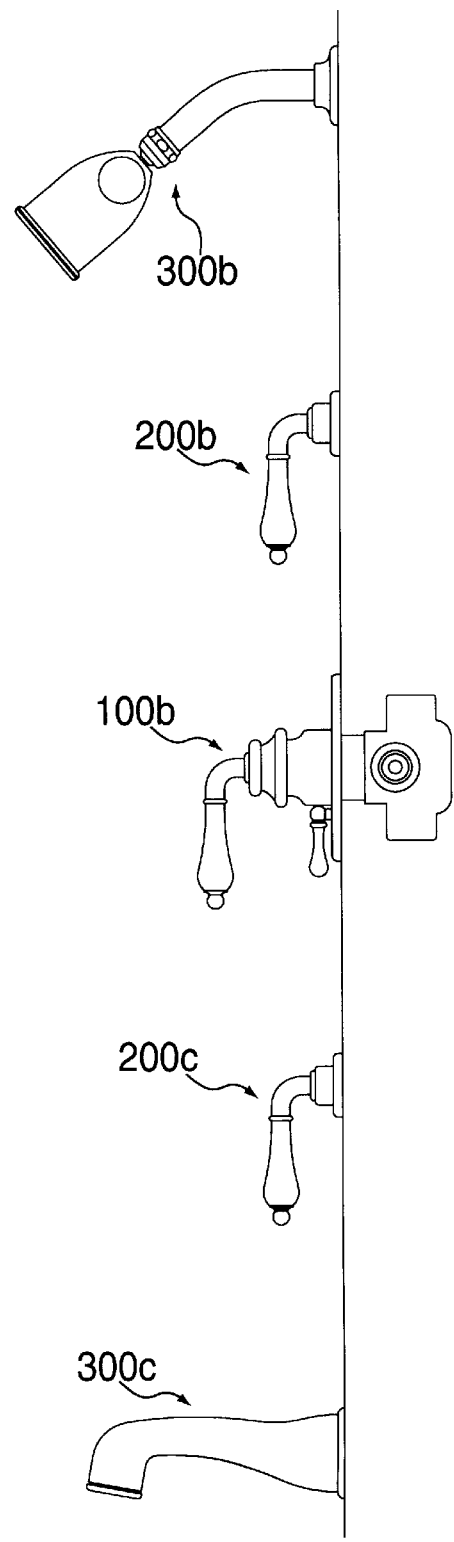
FIG. 1C
(PRIOR ART)
FIG. 1D
(PRIOR ART)

6,021,952

COMBINATION CHECK VALVE, SHUTOFF AND SEAL FOR THERMOSTATIC VALVE

FIELD OF THE INVENTION

The field of this invention is mixing values, such as, for example, thermostatic valves as used in plumbing.

BACKGROUND OF THE INVENTION

Thermostatic valves are used to automatically mix a cold water source and a hot water source to provide an output stream of the desired temperature. As the on/off and volume adjustments are downstream from the thermostatic valve, there are situations where there exists the possibility of feedthrough of hot water supply into the cold water source or vice versa. Check valves are used in the two water supply inlets to insure that such inadvertent mixing is not possible. Also, as a convenience, shutoff valves are used at the supply ports as part of the thermostatic valve. These are used when servicing the thermostatic valve itself or any system components downstream of it. The prior art devices have used separate check valves and shutoff valves along with the appropriate seals to incorporate these elements into a thermostatic valve housing.

OBJECT OF THE INVENTION

It is an object of the present invention to combine check valve, shutoff and seal features to increase efficiency by combining the functions of valve elements and by reducing the size of the combination check valve, shutoff and seals. The resulting cartridge is replaceable, repairable, and low cost.

SUMMARY OF THE INVENTION

In keeping with the aforesaid objects, the present invention includes a combination check valve, shutoff and seal cartridge for a mixing value, such as a thermostatic valve, wherein the thermostatic valve includes hot and cold water inlets communicating with an ON/OFF and volume control water valve. The water output of the water volume control is then plumbed to a tub spout, faucet and/or showerhead.

The thermostatic valve has a body with the cold water inlet and the hot water inlet, integral therein, and a mixed temperature water outlet for mixed water of a predetermined temperature. Each inlet is an engaging means, such as a threaded inlet, a sweat inlet or other appropriate engaging members, and each inlet has respective ports accepting a corresponding combination check valve shutoff and seal cartridges therein.

Each cartridge has a housing with a tension member, such as a spring, therein. Other tension members, such as a diaphragm, could be utilized as well. To prevent leakage, the cartridge housing has a pair of elastomeric O-rings in grooves therein. The cartridge housing has a check seat element, and a pair of elastomeric stop seals fitted in respective sides of the cartridge housing.

The seals seal a fluid flow path to respective inner sides of the ports of the thermostatic valve body at the respective hot and cold water inlets of the thermostatic valve body.

The seals also function both as check valves and shutoff valves of the cartridge housing. In an open position water pressure overcomes the spring force of the spring, pushing the seat element away from a respective seal a predetermined distance to permit entry of cold water therein.

Furthermore, the cartridge housing is rotatable 180 degrees in either direction to shut off the flow of water therethrough.

In a closed shutoff valve mode, the cartridge housing is rotatable, such as, for example, 180 degrees, wherein water inlet pressure creates a force in the same direction as the spring which forces the check seat element against the seal, to prevent the flow of hot or cold water therethrough.

BRIEF DESCRIPTION OF THE DRAWINGS

The present invention can best be understood in combination with the accompanying drawings, in which:

FIG. 1C is a front elevational view of a typical tub and shower fixture incorporating a thermostatic valve therein;

FIG. 1D is a side elevational view of the typical tub and shower fixture incorporating a thermostatic valve therein as in FIG. 1C;

DETAILED DESCRIPTION OF THE PREFERRED EMBODIMENTS

Figure 1A:
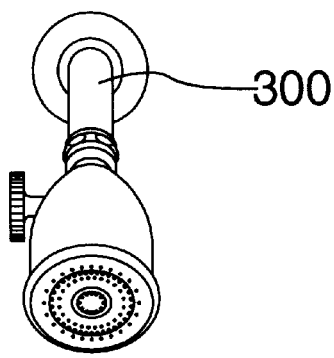
FIG. 1A is a front elevation of a typical plumbing wall mounted shower fixture incorporating a thermostatic valve therein.
Figure 1A:
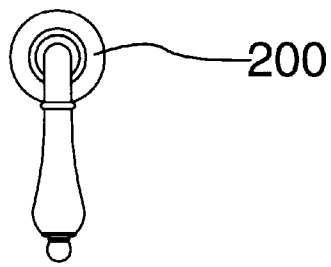
Figure 1A:
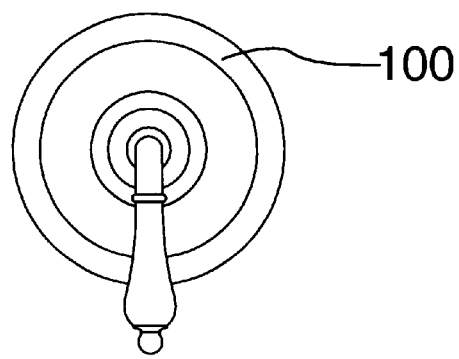
Figure 1B:
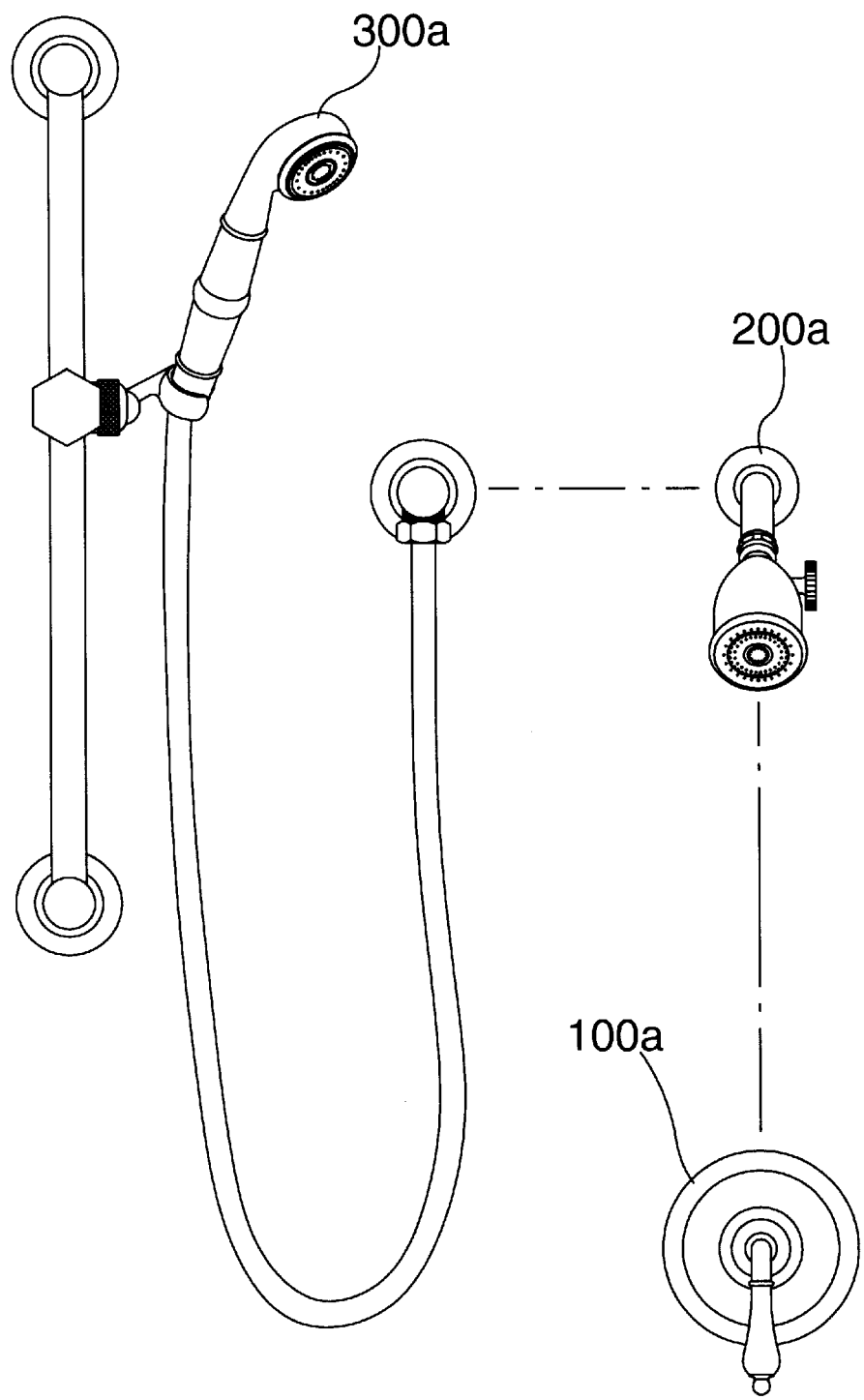
FIG. 1B is a front elevational view of a typical hand held shower fixture incorporating a thermostatic valve therein.

FIG. 1A, 1B, 1C and 1D show typical tub, shower or other plumbing installations incorporating a mixing valve, such as thermostatic valves 100, 100a or 100b. Thermostatic valves 100, 100a or 100b accept hot and cold water inlets. Water is plumbed to ON/OFF and volume controls 200, 200a, 200b or 200c. The water output of the latter ON/OFF and volume controls 200, 201, 202 or 200c is then plumbed to showerhead 300, as in FIG. 1A, hand held spray faucet 300a, as in FIG. 1B, or to either showerhead 300b or tub spout 300c, as in FIGS. 1C and 1D.

Figure 2:
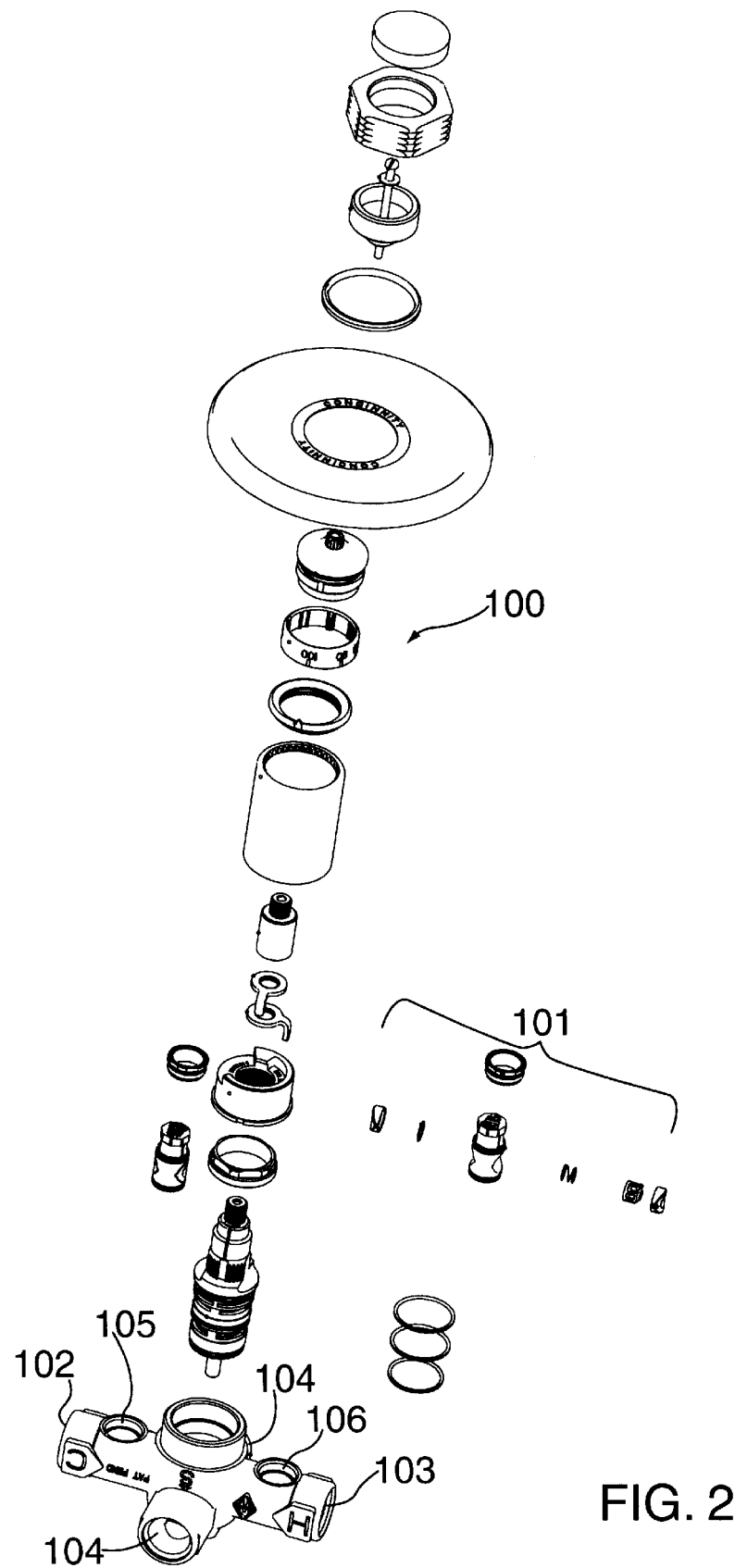
FIG. 2 is an exploded isometric view of a thermostatic valve, showing the check/seal/shutoff valve cartridge of the present invention therein.

FIG. 2 is an exploded view of the components that make up a mixing valve, such as thermostatic valve body 100. Thermostatic valve body 100 has a cold water inlet 102 and a hot water inlet 103. The outlet for mixed water of the proper temperature is 104 or 104a. Engaging ports, such as threaded ports 105 and 106, accept the combination check valve, seal and shutoff cartridges 101 of this invention. Other engaging ports, such as sweat inlets, may also be used. Other means of securing cartridges 101, like retaining rings, clips or pins (not shown) may be employed as well.

Figure 5:
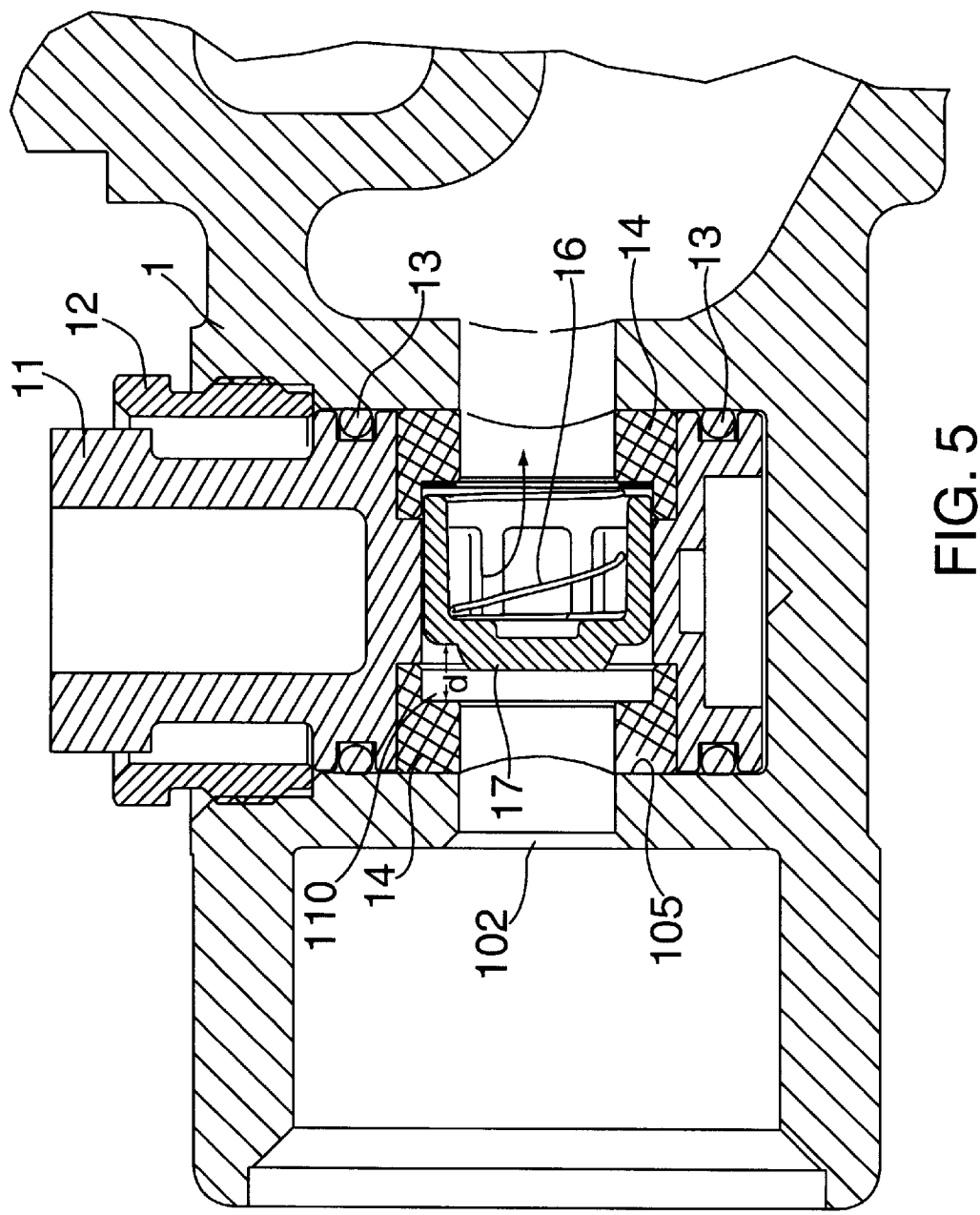
FIG. 5 is a close up side view in cross section of the combination check/seal/shutoff valve cartridge in the open position.
Figure 6:
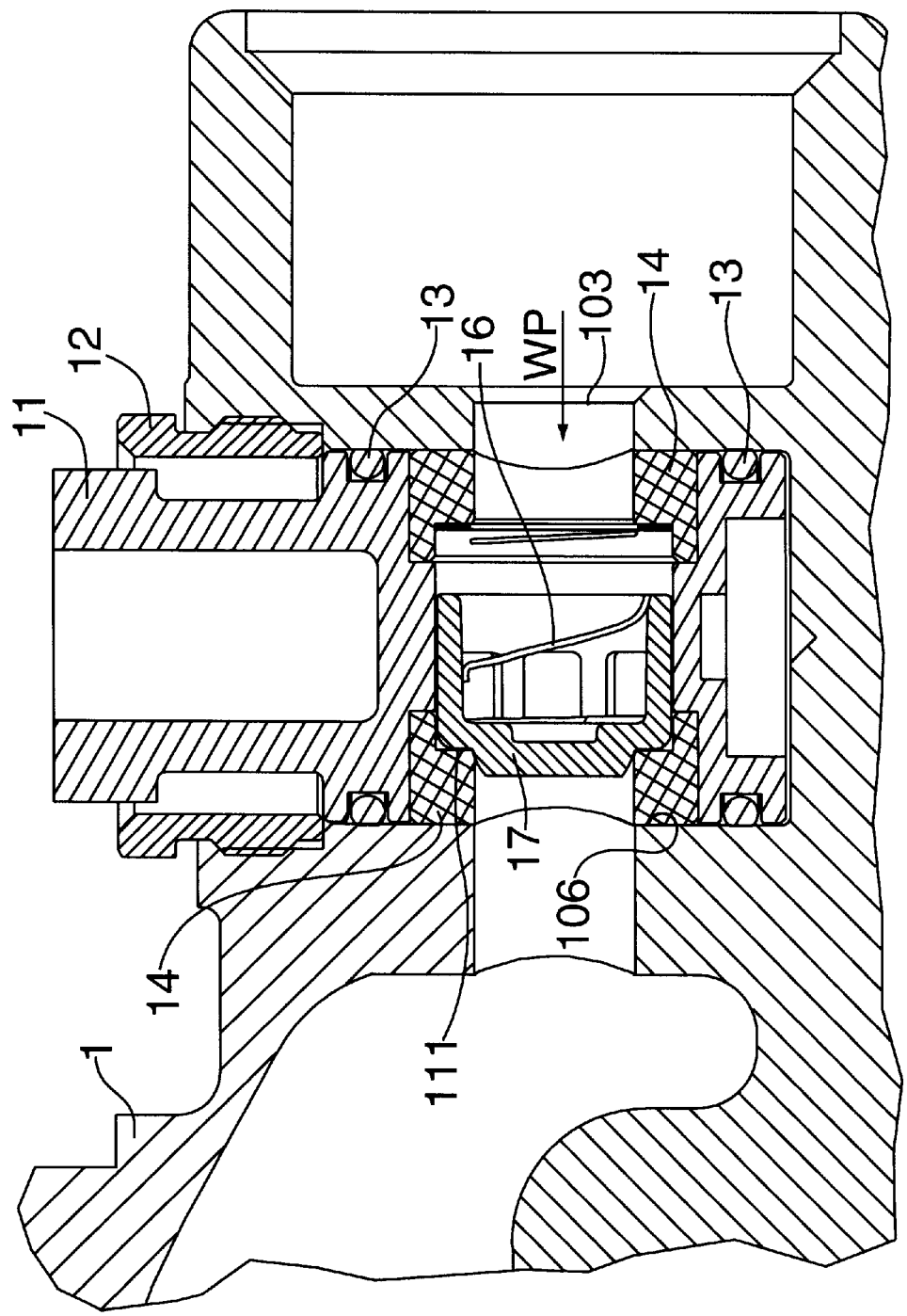
FIG. 6 is a close up side view in cross section of combination check/seal/shutoff valve cartridge in the closed, shutoff position.

As shown in FIGS. 2, 5 and 6, cartridges 101 include a subassembly of several components made of a variety of materials, such as, for example, rigid molded plastic parts, elastomeric seals, and metal parts, such as spring 16, washer 15 and threaded collar 12.

Cartridge check valve stop housing 11, preferably made of molded plastic, has two elastomeric O-rings 13 in grooves on opposite sides of housing 11.

Movable seat element 17 is preferably a molded plastic part that plays an integral role in both the check valve and shutoff valve functions. Two elastomeric stop seals 14 fit in the sides of housing 11 and seal the fluid flow path to the inner sides of either recess 105 or 106 at the water inlets of valve body 100. These same seals 14 function both in the check valve or shutoff valve mode of combination valve cartridge 101.

FIG. 2 also shows conventional parts of thermostatic valve 100, namely, top cap 34, trim handle 35, handle base 22 with washer 28, and handle screw 23, wherein handle base 22 is above plate gasket 10 with O-ring 30. Thermostatic valve 100 also has face plate 18 covering spline adapter 6, dial 7 in sleeve 9, and O-ring 21 in dial insert 8. Also in sleeve 9 are two limit stops 5 within stop ring 4 and cartridge locket nut 3, which is placed over standard heat sensitive thermo cartridge 2, which is inserted within valve body 100.

Figure 3:
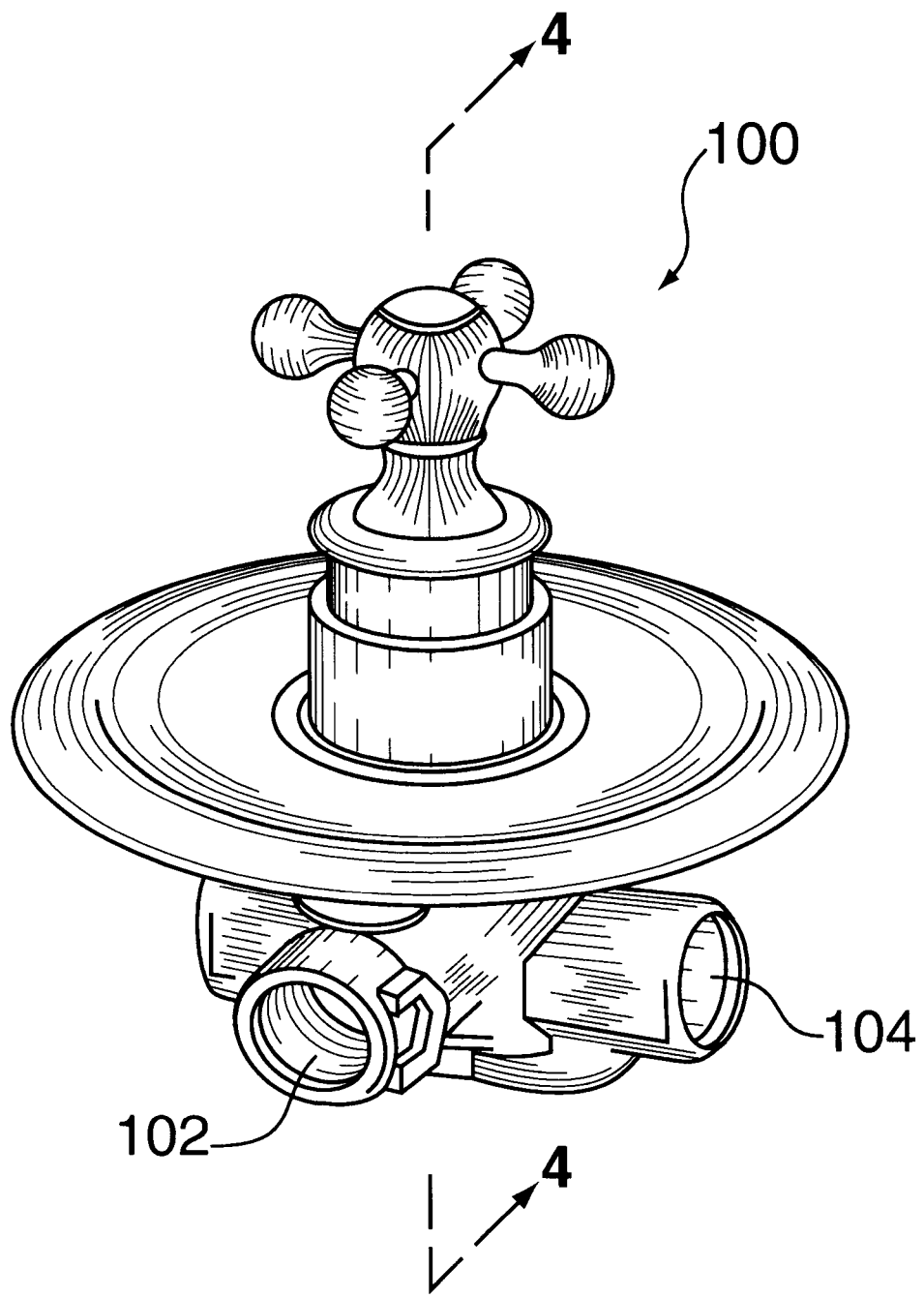
FIG. 3 is an isometric view of a thermostatic valve.

FIG. 3 shows an isometric view of thermostatic valve 100 with cross section plane A—A indicated.

Figure 4:
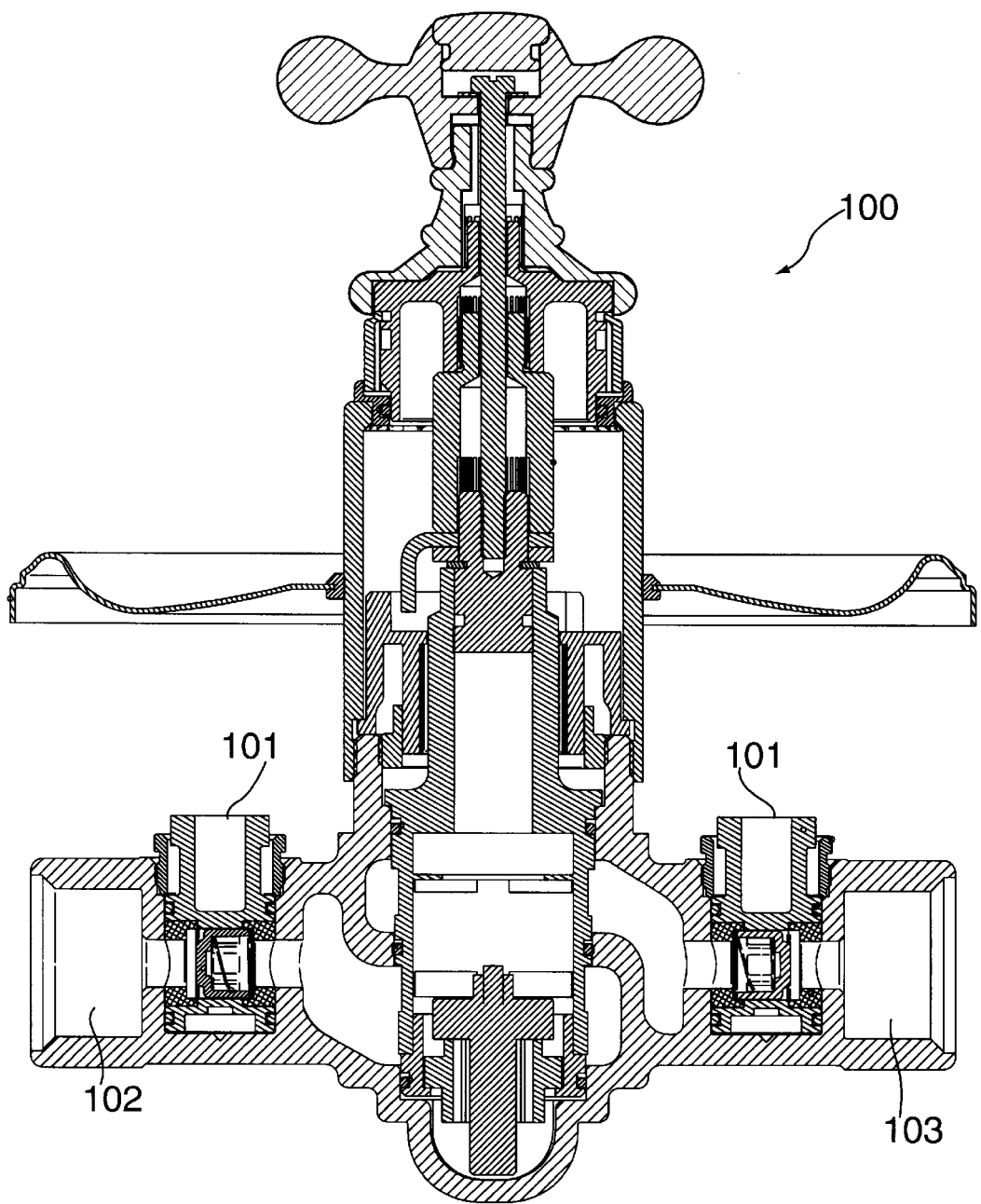
FIG. 4 is a side view in cross section of a thermostatic valve, showing the check/seal/shutoff valve cartridge of the present invention therein.

FIG. 4 is a cross sectional view taken at line A—A, showing the position of combination check valve seal shutoff cartridges 101 adjacent to cold water inlet 102 and hot water inlet 103.

FIG. 5 is a close up cross sectional detail view showing a combination check/seal/shutoff valve cartridge 101 in recess 105 in the open position, with water pressure overcoming the spring force of seal spring 16, pushing seat element 17 away from seal 14 a distance "d", as noted in area 110, to permit entry of cold water. This is the check valve function of combination check/seal/shutoff valve cartridge 101. By using the screwdriver slot at the top of housing 11 to turn the housing 11 180 degrees in either direction, the flow of water can be shut off.

FIG. 6 is a close up cross sectional detail view of combination check valve seal shutoff cartridge 101 in the closed shutoff valve mode. Cartridge 101 is placed in recess 106 adjacent to hot water inlet 103. In FIG. 6, housing 11 has been rotated such that inlet water pressure, indicated by arrow "WP", now creates a force in the same direction as the force of spring 16, thus forcing seat element 17 against seal 14, preventing the flow of hot water from inlet 103.

In another embodiment cartridge 101 may be used with a fluid source, such as a hot or cold water source, or other source of fluid therethrough. The fluid source includes at least one fluid inlet communicating with a fluid flow control, wherein the fluid output, such as hot or cold water or open fluid of the fluid flow control is plumbed to at least one fluid output, such as a drinking water fountain or a heated water output for hot beverages. The fluid source has a body with at least one fluid inlet together with the at least one fluid output, which has at least one port accepting cartridge 101 therein.

Cartridge 101 has a tension member and a movable seat element responsive to force of said tension member. In a closed position the seat element moves away from the seal within the body, wherein in the open position fluid pressure overcomes force of the tension member, pushing the seat element away from the seal a predetermined distance to permit entry of fluid therein.

Alternatively, cartridge 101 may be rotatable in either direction to shut off the flow of fluid therethrough, wherein in a closed shutoff mode the housing is rotatable, wherein inlet fluid pressure from an opposite direction creates a force in the same direction as the force of the tension member, thus forcing the seat element against the seal, preventing flow of fluid therethrough.

It is further noted that other modifications may be made to the present invention without departing from the scope of the invention, as noted in the appended claims.

We claim:

1. A combination check valve, shutoff and seal cartridge for a mixing valve, wherein the mixing valve includes hot and cold water inlets communicating with an ON/OFF and volume control and water valve, wherein the water output of the water volume control is then plumbed to a tub spout faucet or showerhead or other plumbing device(s), the mixing valve having a body with the cold water inlet and the hot water inlet therein, together with a mixed temperature water outlet for mixed water of a predetermined temperature, each said inlet having one of said cartridges upstream of the mixed temperature water outlet removably mounted in a port in said water inlet, each said cartridge comprising:

a housing containing an opening therethrough directly in the line of water flow through said housing and a seat element within said opening movable along the path of the flow of water through said opening;

means comprising an elastomeric seal within said opening both at the upstream and downstream ends of said housing in contact with the structure of said port of said water inlet for sealing the fluid flow path through said housing; and means within said opening comprising a tension element biasing said seat element against the direction of flow of said water from the respective inlet, said seat element being biased into contact with the upstream elastomeric seal in the absence of water flow from the respective inlet thereby functioning as a check valve blocking flow from the other water inlet and said seat element being moved away from the upstream elastomeric seal when water flows through said cartridge from the respective inlet.

2. The combination check/shutoff/seal valve cartridge as in claim 1 wherein in a closed shutoff valve mode said housing is rotatable, said cartridge having means to redirect inlet water pressure against said seal element in the same direction as the force exerted by said tension member forcing said seat element against said upstream elastomeric seal, preventing a flow of water therethrough from the respective inlet.

3. The combination check/shutoff/seal valve cartridge as in claim 1 wherein said mixing valve is a thermostatic valve.

4. The combination check/shutoff/seal valve cartridge as in claim 1 wherein said tension member is a spring.

5. The combination check/shutoff/seal valve cartridge as in claim 1 wherein each said cartridge is threadably engagable with each said inlet.

6. A combination shutoff and seal cartridge for a fluid source, wherein the fluid source includes at least one fluid inlet communicating with a fluid flow control, wherein the fluid output of the fluid flow control is then plumbed to at least one fluid output, the fluid source having a body with at least one fluid inlet therein, together with a fluid outlet said at least one inlet having at least one port accepting said combination shutoff and seal cartridge, said cartridge comprising:

a housing having a tension member therein;

said housing having a movable seat element;

said housing having at least one elastomeric stop seal fitted in said housing, said seal sealing a fluid flow path to an inner side of said port of said fluid source body at the fluid inlet of said body;

said seal also functioning as a shutoff valve of fluid flow within said housing, wherein in an open position fluid pressure overcomes a force of said tension member pushing said seat element away from a seal a predetermined distance to permit entry of fluid therein; and means upon rotation of said housing by 180 degrees for redirecting fluid flow from the inlet to block all flow of fluid through said housing.

7. The combination shutoff and seal cartridge for a fluid source as in claim 6, wherein further in a closed, shutoff mode said housing is rotatable 180 degrees in either direction to shut off the flow of fluid therethrough; and, wherein inlet fluid pressure creates a force in the same direction as the force of said tension member, thus forcing said seat element against said seal, preventing a flow of fluid therethrough.

8. The combination shutoff and seal cartridge for a fluid source as in claim 6 wherein said fluid source is a water source.

9. The combination shutoff and seal cartridge for a fluid source as in claim 8 wherein said fluid output is a water faucet.

10. The combination shutoff and seal cartridge for a fluid source as in claim 6 wherein said at least one fluid inlet is a cold water inlet.

11. The combination shutoff and seal cartridge for a fluid source as in claim 6 wherein said at least one fluid inlet is a hot water inlet.

12. The combination shutoff and seal cartridge for a fluid source as in claim 6 further comprising a mixing valve wherein said at least one fluid inlet is a cold water inlet and a hot water inlet communicating with said mixing valve.

13. A mixing valve for hot and cold water comprising:

hot and cold water inlets;

a mixed temperature water outlet for receiving the hot and cold water from said inlets;

a combination shut off and check valve cartridge removably and rotatably mounted in a port within each of said inlets;

each said cartridge comprising a housing containing an opening directly in the line of flow of water through said housing;

sealing means mounted in said opening for sealing both the upstream and downstream ends of said cartridge within said housing;

a hollow seat element closed at the upstream end thereof slidable within said opening in the direction of the flow of water through said opening;

means mounted within said seat element for biasing said seat element against the sealing means at the upstream end of said opening, whereby flow of water from the respective inlet will overcome said biasing means permitting flow of water into said mixed temperature water outlet, and in the absence of water flow from the respective inlet preventing backflow from the other inlet of said mixing valve; and means upon rotation of said cartridge from its normal operating position to redirect the flow of water to drive said seat element in the same direction as said biasing means against the upstream sealing means of said housing thereby blocking all flow through the respective inlet.

* * * * *